(12) United States Patent
MacDonald et al.

(10) Patent No.: US 11,014,792 B2
(45) Date of Patent: May 25, 2021

(54) LIGHT WEIGHT JACK STAND

(71) Applicant: JP COMPOSITES PTY LTD, Brisbane (AU)

(72) Inventors: Brian MacDonald, Brisbane (AU); Matthew Dow, Brisbane (AU); Michael Hinchy, Brisbane (AU)

(73) Assignee: Stand Technologies Pty Ltd

( * ) Notice: Subject to any disclaimer, the term of this patent is extended or adjusted under 35 U.S.C. 154(b) by 72 days.

(21) Appl. No.: 16/094,010

(22) PCT Filed: Apr. 19, 2017

(86) PCT No.: PCT/AU2017/050349
§ 371 (c)(1),
(2) Date: Oct. 16, 2018

(87) PCT Pub. No.: WO2017/181229
PCT Pub. Date: Oct. 26, 2017

(65) Prior Publication Data
US 2019/0127192 A1 May 2, 2019

(30) Foreign Application Priority Data

Apr. 19, 2016 (AU) ................................ 2016901457

(51) Int. Cl.
*B66F 7/06* (2006.01)
*F16M 11/22* (2006.01)
(Continued)

(52) U.S. Cl.
CPC ............... *B66F 7/06* (2013.01); *B29C 70/32* (2013.01); *B29C 70/52* (2013.01); *B66F 3/00* (2013.01);
(Continued)

(58) Field of Classification Search
CPC ...... B66F 7/06; B66F 3/00; B66F 3/08; B66F 13/00; B66F 7/28; B66F 2700/09;
(Continued)

(56) References Cited

U.S. PATENT DOCUMENTS 964,394 A * 7/1910 Coddington .............. B66F 3/08
254/100
1,171,626 A * 2/1916 Moore ...................... B66F 3/08
254/98
(Continued)

FOREIGN PATENT DOCUMENTS

GB 1573877 A 8/1980
WO 2008/147393 A1 12/2008
WO 2008/147393 A9 12/2008

OTHER PUBLICATIONS

Extended European Search Report dated Sep. 18, 2019; Application No. 17785160.7 in the name of Stand Technologies Pty Ltd.
(Continued)

*Primary Examiner* — Muhammad Ijaz
(74) *Attorney, Agent, or Firm* — Tucker Ellis LLP

(57) ABSTRACT

The present invention relates to a jack stand. The jack stand includes a base. A post, including composite material, extends from the base. The jack stand also includes a top for topping the post and for engaging with a load. Advantageously, the post may be lightweight (typically less than 12 kg) enabling the jack stand to be conveniently moved by a single person without exposing the person to significant risk of injury. The jack stand may be moved as a whole, or in parts.

18 Claims, 4 Drawing Sheets

(51) Int. Cl.
  *B66F 3/00* (2006.01)
  *B29C 70/32* (2006.01)
  *B29C 70/52* (2006.01)
  *F16M 11/26* (2006.01)
  *B66F 3/08* (2006.01)
  *B66F 13/00* (2006.01)
  *B29L 31/06* (2006.01)
  *B66F 7/28* (2006.01)

(52) U.S. Cl.
  CPC ............... *B66F 3/08* (2013.01); *B66F 13/00* (2013.01); *F16M 11/22* (2013.01); *F16M 11/26* (2013.01); *B29L 2031/06* (2013.01); *B66F 7/28* (2013.01); *B66F 2700/09* (2013.01)

(58) Field of Classification Search
  CPC ........ F16M 11/22; F16M 11/26; B29C 70/32; B29C 70/52; B29L 2031/06
  USPC .................... 248/125.8, 157, 354.3; 187/204
  See application file for complete search history.

(56) References Cited

U.S. PATENT DOCUMENTS

| | | | | |
|---|---|---|---|---|
| 2,723,705 | A | | 11/1955 | Collins |
| 4,042,202 | A | * | 8/1977 | Molinari ................. B66F 13/00 248/352 |
| 4,245,808 | A | * | 1/1981 | John ......................... B66F 3/08 248/165 |
| 5,085,406 | A | * | 2/1992 | Schmaltz ................. B66F 3/08 254/103 |
| 5,180,131 | A | * | 1/1993 | Few ..................... F16M 11/046 248/352 |
| 5,575,591 | A | | 11/1996 | Vanderklaauw |
| 5,611,514 | A | | 3/1997 | Oliver |
| 5,664,762 | A | * | 9/1997 | Rothbauer ................ B66F 3/10 254/103 |
| 5,946,880 | A | | 9/1999 | Morrison, III et al. |
| 6,442,906 | B1 | * | 9/2002 | Hwang ............... E04F 15/0247 248/188.4 |
| 6,659,428 | B2 | * | 12/2003 | Kubota ..................... B66F 3/10 254/100 |
| D513,819 | S | * | 1/2006 | Ji ................................. D34/31 |
| 7,487,576 | B2 | | 10/2009 | Baratta |
| 10,378,680 | B2 | * | 8/2019 | Anderson ................. F16L 3/20 |
| 2005/0211868 | A1 | | 11/2005 | Scott |
| 2009/0179122 | A1 | | 7/2009 | Inzero |
| 2009/0200528 | A1 | | 8/2009 | Seber |
| 2009/0283653 | A1 | * | 11/2009 | Zhang .................... F16M 11/22 248/352 |
| 2010/0218839 | A1 | * | 9/2010 | Conley ..................... B32B 1/08 138/130 |
| 2012/0112147 | A1 | * | 5/2012 | Hernandez, Jr. .......... B66F 3/30 254/93 H |
| 2013/0167502 | A1 | * | 7/2013 | Wilson ................... B29D 99/00 57/210 |
| 2014/0145042 | A1 | * | 5/2014 | Adamson ............... F16M 11/22 248/125.8 |
| 2014/0145044 | A1 | | 5/2014 | Ceravolo |
| 2015/0308612 | A1 | * | 10/2015 | Chen ....................... F16M 11/18 248/352 |
| 2016/0194895 | A1 | * | 7/2016 | Whiteley ............. E04H 12/2261 248/346.5 |
| 2017/0349416 | A1 | * | 12/2017 | Sigouin ..................... B66F 5/04 |
| 2019/0127192 | A1 | * | 5/2019 | Macdonald ............ F16M 11/26 |
| 2020/0048056 | A1 | * | 2/2020 | Bush ......................... B66F 3/08 |

OTHER PUBLICATIONS

PCT International Preliminary Report on Patentability from the International Application No. PCT/AU2017/050349, dated Aug. 14, 2018, 33 pages.
Examiner's Report dated Jan. 25, 2021; Indian Application No. 201827039648.

* cited by examiner

LIGHT WEIGHT JACK STAND

RELATED APPLICATION DATA

This application is a national phase application of International Application No. PCT/AU2017/050349 filed Apr. 19, 2017 and published in the English language, which claims priority to AU 2016901457 filed Apr. 19, 2016, which are hereby incorporated herein by reference.

TECHNICAL FIELD

The present invention relates to a light weight jack stand. The present invention has particular, although not excusive application to heavy-duty industrial jack stands for supporting vehicles, equipment, machinery and other like heavy loads (up to at least 30 tonne) in the earthmoving, trucking, mining and construction fields.

BACKGROUND

The reference to any prior art in this specification is not, and should not be taken as an acknowledgement or any form of suggestion that the prior art forms part of the common general knowledge.

Jack stands are commonly used to safely support heavy mining trucks that have been raised by a jack, or other means, for maintenance.

Known jack stands are formed from metal parts such as steel to sustain the weight of the trucks. In turn, the jack stands themselves are very heavy which makes them cumbersome to move around. In practice, multiple persons are required to safely lift and position the jack stands in place which undesirably presents an injury risk. Alternatively, forklifts or loaders are used to lift and position the jack stands which is safer, but often less convenient, more expensive, slower and less productive.

There is a need for a light weight jack stand that can be manually moved in a safe and convenient manner, but which can still safely support the required applied loads.

SUMMARY OF THE INVENTION

According to one aspect of the present invention, there is provided a jack stand including:
 a base;
 a post including composite material formed via a pultrusion process and for extending from the base, the composite material including reinforcing fibres wound around the post to improve compressive strength, the reinforcing fibres being separately wound in both clock-wise and anticlockwise directions along the post to further improve compressive strength; and
 a top for topping the post and for engaging with a load.

Advantageously, the post may be lightweight (typically less than 12 kg) enabling the jack stand to be conveniently moved by a single person without exposing the person to significant risk of injury. The jack stand may be moved as a whole, or in parts.

The composite material may include polymeric resin material and high strength fibres. The fibre material may include glass fibre, carbon fibre, and aramid fibre. The composite material may include a matting to align fibers in orientations other than longitudinally along the post to improve compressive strength. The post may be tubular. The post may be rated to up to at least 12 tonne. The post may have a single wall. The post may be rated up to 12 tonne. Alternatively, the post may have two or more walls. The post may be rated up to 30 tonne. The walls may be bonded together. The post may include a curved (e.g. circular) wall and a quadrilateral (e.g. square) wall.

The base may be wider than the post to distribute weight of the load. The base may define a receptacle for receiving the post. The receptacle may include an outer wall and an inner wall of different shape and for forming a complementary fit with the post. The base may include a plate from which the receptacle extends. The base may further include one or more strengthening fillets extending between the receptacle and the plate.

The top may define a receptacle for receiving the post. The top may define a cradle for cradling and contacting the load. The top may include a cap for capping the post.

The base and/or top may include metal material, preferably steel or metal alloy.

The jack stand may include a handle fastened to the post.

According to another aspect of the present invention, there is provided a jack stand assembly including:
 at least one jack stand; and
 at least one upright extending from a respective jack stand; and
 an accessory supported by the upright.

The upright may be adjustable. The upright may include a pair of tubes that can slide relative to each other. The assembly may include a fastener for fastening the tubes together.

The upright may be received in a post of the jack stand. The assembly may include a fastening arrangement for fastening the upright to a base of the stand. The fastening arrangement may include a retainer for inserting into the base and a threaded fastener for passing through the retainer and engaging with a thread of the upright. The retainer may include a plate from which one or more ledges extend into the base. The upright may include a floor defining the thread.

The assembly may include a rotation inhibitor for inhibiting rotation of the upright in the stand. The inhibitor may include a pin passing through the stand and the upright. The accessory may include a fastener for fastening to the upright.

The accessory may include a platform for supporting cables or hoses. The accessory may include one or more rollers for supporting material being fed to a machine. The accessory may include a holder for holding a object. The holder may include a pair of angled rollers for holding the hull of a boat.

According to another aspect of the present invention, there is provided a jack stand post including composite material formed via a pultrusion process, the composite material including reinforcing fibres wound around the post to improve compressive strength, the reinforcing fibres being separately wound in both clock-wise and anticlockwise directions along the post to further improve compressive strength.

According to another aspect of the present invention, there is provided a method of manufacturing a jack stand, the method involving:
 forming a post by pultruding with fibres and liquid polymeric resin material in a heated die to form composite material, the forming involving winding reinforcing fibres around the post to improve compressive strength, the reinforcing fibres being separately wound in both clock-wise and anticlockwise directions along the post to further improve compressive strength.

The step of forming may involve introducing a matting to align fibers of the composite material in orientations other than longitudinally along the post to improve compressive strength.

Any of the features described herein can be combined in any combination with any one or more of the other features described herein within the scope of the invention.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DETAILED DESCRIPTION OF PREFERRED EMBODIMENTS

Figure 1:
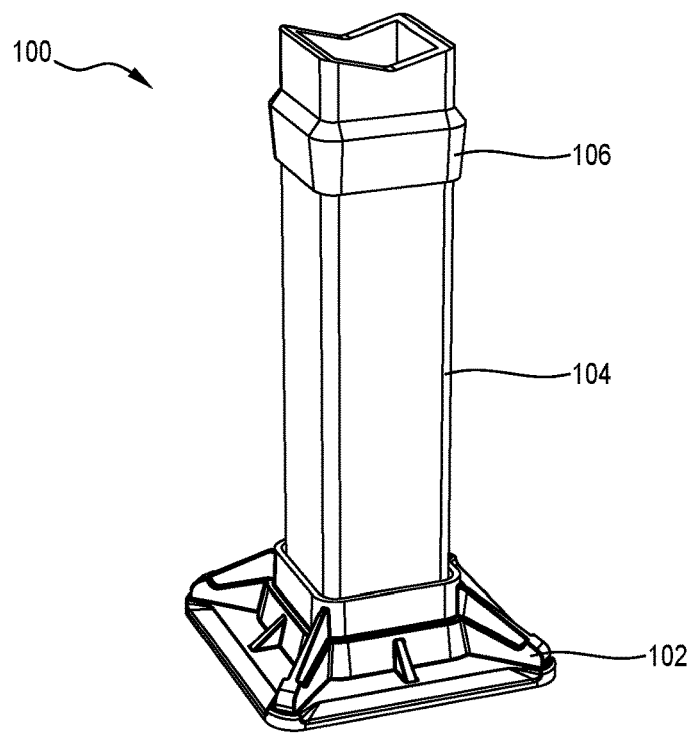
FIG. 1 is a perspective view of a 12 tonne jack stand in accordance with an embodiment of the present invention.

According to an embodiment of the present invention, there is provided an industrial heavy-duty twelve-tonne (12 t) jack stand 100 as shown in FIG. 1. The stand 100 includes a base 102 for resting on the ground. A post 104 including composite material is provided and extends upwardly from the base 102. The jack stand 100 further includes a top 106 for topping the post 104 and for engaging with a vehicle (load).

Advantageously, the post 104 is lightweight (typically less than 12 kg) enabling the jack stand 100 to be conveniently moved by a single person without exposing the person to significant risk of injury. The jack stand 104 can be moved as a whole, or in parts.

Figure 2:
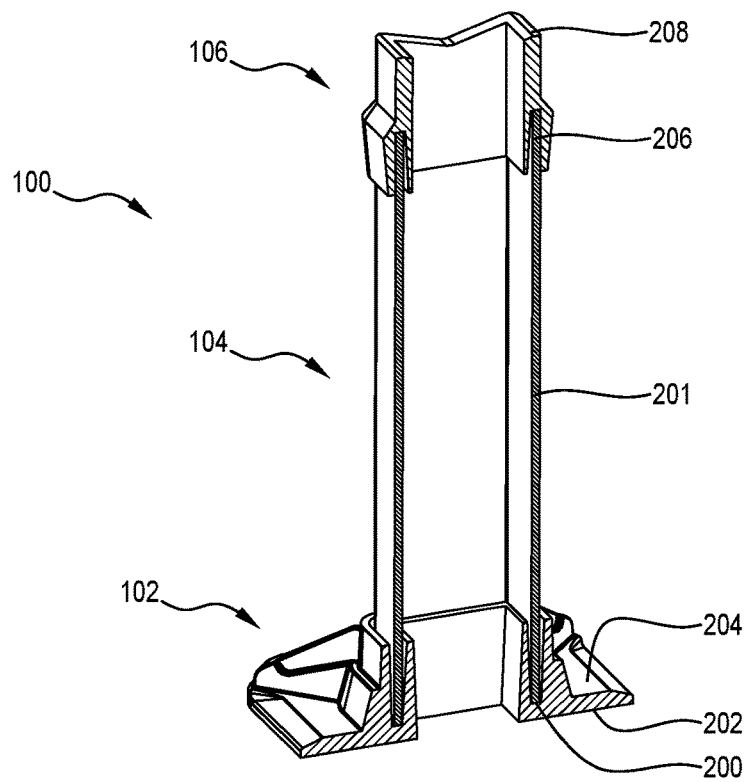
FIG. 2 is a sectional perspective view of the jack stand of FIG. 1.

Turning to FIG. 2, the post 104 has a square and tubular single wall 201, although is still comfortably rated to hold up to 12 tonne (with a safety factor of 3×).

The base 102 is wider than the post 104 to distribute weight of the vehicle and to provide stability relative to the height of the post. Furthermore, the base 102 defines a receptacle 200, in the form of an endless square channel, for complementarily receiving a lower end of the post 104. The base 102 also includes a flat plate 202 from which the receptacle 200 extends. Strengthening fillets 204 extend between the receptacle 200 and the plate 204.

The top 106 also defines a receptacle 206 for receiving the top end of the post 104. In effect, the top 106 defines an annular cap for snugly capping the post 104. In addition, the top 106 defines a topside cradle 208 for cradling an axle of the vehicle. The top 106 may also be of a flat section, for use on flat undersides of vehicles/machines or on their chassis rails.

The base 102 and top 106 are cast from metal material, preferably steel or metal alloy.

The composite material of the post 104 is pultruded, and includes polymeric resin material and fibres. The composite material also includes a matting to align fibers in orientations other than longitudinally along the post to improve compressive strength. The composite material further includes reinforcing fibres wound around the post to improve compressive strength. The reinforcing fibres can be separately wound in both clock-wise and anticlockwise directions along the post 201 to further improve compressive strength. The foregoing construction provides a lightweight jack stand 100 that is strong enough to sustain heavy-duty industrial loads.

A method of manufacturing the jack stand 100, with the post 104 including the light weight and strong composite material, is now briefly described.

The post 104 is formed by pultruding fibres and polymeric material to form the composite material. Pultrusion is a continuous moulding process whereby reinforcing fibres are saturated with a liquid polymer resin and then carefully formed and pulled through a heated die to form a uniform composite part. The manufacturing of parts or components by pultrusion results in straight constant cross section parts of virtually any desired length. The liquid polymer resin can be added to the matrix of structural fibres either before or during forming in the heated die.

Conventional pultrusion processes usually utilise very long reinforcing fibres or braided strands. The reinforcing fibres may include glass fibre, carboin fibre or aramid fibre. The strands are unfurled from coiled rolls (often called rovings) and longitudinally drawn into the preforming, resin impregnation and stationary die system.

Composite materials manufactured by the foregoing pultrusion process have exceptional strength to weight properties in resisting tensile loads but relatively poor strength to weight properties in resisting compressive loads. This is due to the exceptional tensile load bearing material properties of the reinforcing fibres contained within the composite structural matrix.

The forming of the post 104 involves introducing a woven reinforcing fibre matting in the structural fibre matrix of the resultant post 104 to align fibers of the composite material in orientations other than longitudinally along the elongate post 104 to improve compressive strength. The resulting product has an increased ability to resist compressive forces as compared to products that do not have any form of other than longitudinal fibre orientation, as these fibres are to a greater or lesser degree placed under some form of tensile load. The matting is introduced either within the body of the composite material and/or as a surfacing material, to bind and surround the matrix of structural fibres in the pultrusion process. The surfacing material contributes the structural ability of the product but more importantly ensures a smooth acceptable finish is achieved for the finished part.

The forming of the post 104 further involves winding reinforcing fibres around the composite material to improve compressive strength. The additional reinforcing fibres are axially wound around the composite material along the longitudinal axis of the post 104, and hence around the longitudinal fibres and the woven mat, which can significantly increase the ability of the post 104 to resist compressive loads.

The reinforcing fibres may be separately wound in both clock-wise and anticlockwise directions along the post 104 to further improve compressive strength. The windings are laced into the matrix to provide comprehensive tensile load capacity in multiple axes of load.

Winding of the reinforcing fibres into the pultruded fibre matrix can be undertaken with large rotating frames holding the coiled reinforcing fibre rovings. Each roving rotates at a desired rotational speed relative to the longitudinal pultrusion process flow rate, and rotates in the rotational direction to achieve desired axial windings and density of fibre construction. Successive rotating frames can be counter-rotating to achieve the differential orientation of the windings.

Manufacturing pultruded composite products in such a manner exhibits a substantially improved capability to resist compressive loads when compared to conventionally manufactured products that are not manufactured in this manner. Such products can be of any form or shape, including round, square, rectangular or angular, and of differing dimensions.

The manufacturing of pultruded composite products that can achieve an adequate level of compressive load resistance offers significant opportunities for industrial uses, given the product's inherent properties of light weight relative to its load bearing capacity. When compared to existing steel or metal allow products, the incorporation of pultruded composite products as the primary load bearing support element may offer significant advantages.

Figure 3:
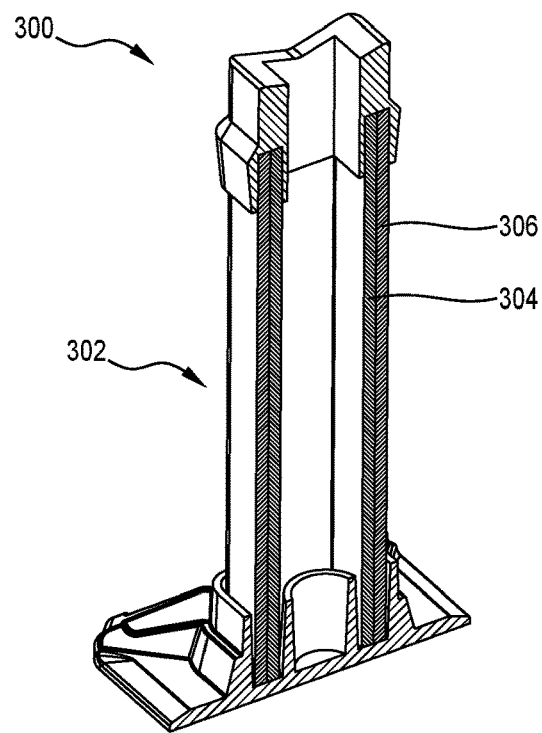
FIG. 3 is a sectional perspective view of a 30 tonne jack stand in accordance with another embodiment of the present invention.

According to another embodiment of the present invention, there is provided an industrial heavy-duty thirty-tonne (30 t) jack stand 300 as shown in FIG. 3. The light-weight jack stand 300 is of similar construction to the jack stand 100 of FIG. 1.

However, the upright post 302 has two walls 304, 306, and is safely rated up to 30 tonne (with a factor of safety of 3×). In particular, the post includes a circular (i.e. curved) inner wall 304 and a square (i.e. quadrilateral) outer wall 306. The walls 304, 306 are bonded together along their length. Advantageously, the post 104 is lightweight (typically less than 15 kg) enabling the jack stand 100 to still be conveniently moved by a single person.

Figure 4:
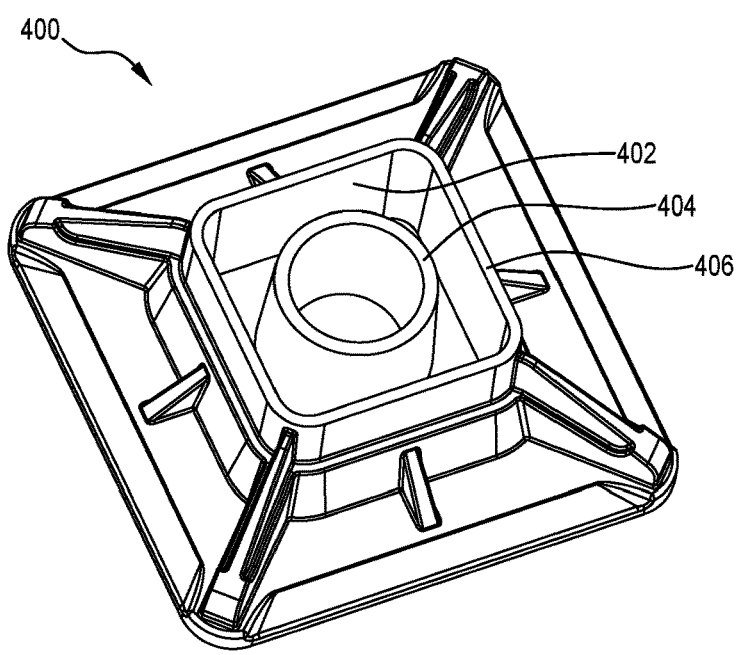
FIG. 4 is a perspective top view of a base of the jack stand of FIG. 3.

FIG. 4 shows the base 400 of the jack stand 300. The base 400 defines a receptacle 402 with a circular inner wall 404 and square outer wall 406 to form a complementary fit with the post 302. The post walls 304, 306 fit snuggly between the receptacle walls 404, 406.

Figure 5:
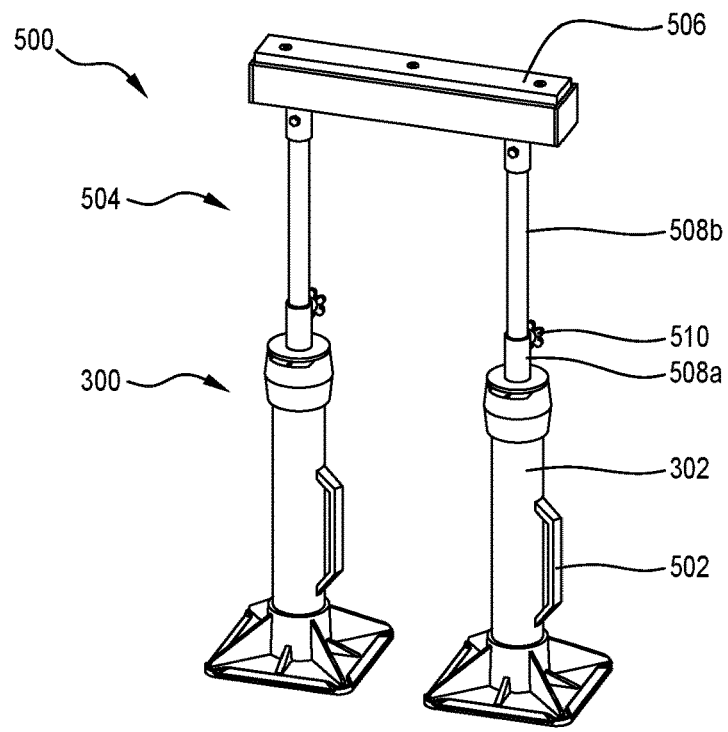
FIG. 5 is a perspective view of a jack stand assembly including the jack stand of FIG. 3.

A jack stand assembly 500 including a pair of jack stands 300 is shown in FIG. 5. Each jack stand includes a handle 502 fastened to the post 302. The jack stand assembly 500 includes two adjustable and extendable uprights 504 extending from the top of respective jack stands 300. A platform accessory 506 is supported by the uprights 504.

Each upright 504 includes a pair of tubes 508a, 508b that can slide relative to each other to adjust the overall length. The assembly 500 further includes a screw fastener 510 for fastening the tubes 508a, 508b together at a fixed length.

Figure 6:
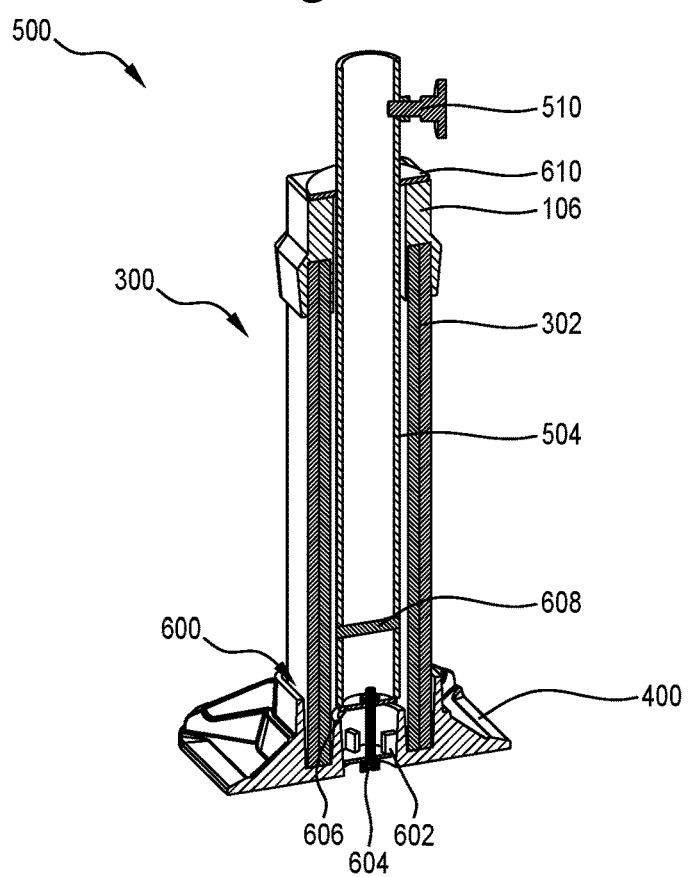
FIG. 6 is a sectional perspective view of a portion of the jack stand assembly of FIG. 5.
Figure 7:
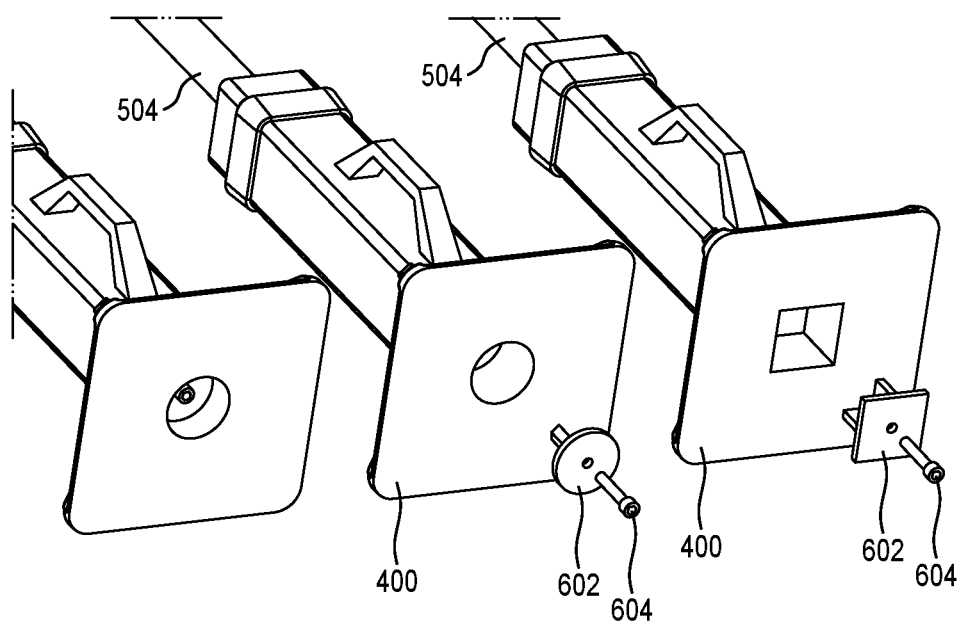
FIG. 7 is a lower perspective view showing assembly of the jack stand assembly of FIG. 5.

As can best be seen in FIG. 6, the upright 504 is received in the post 302 of the jack stand 300. The assembly 500 further includes a bottom fastening arrangement 600 for fastening the tubular upright 504 to the base 400 of the stand 300. The fastening arrangement 600 includes a retainer 602 for inserting into the base 400 (see FIG. 7). The fastening arrangement 600 also includes a threaded screw fastener 604 for passing through the retainer 602 and engaging with a floor thread of the upright 504. The retainer 602 includes a plate from which one or more ledges extend into the base 400. The upright 504 includes a floor 606 defining the floor thread.

The assembly 500 further includes a rotation inhibitor 608 for inhibiting rotation of the upright 504 in the stand 300. The inhibitor 608 includes a pin passing through the stand 300 and the upright 504. A collar 610 surrounds the upright 504 and forms a stop for abutting the jack top 106.

Figure 8:
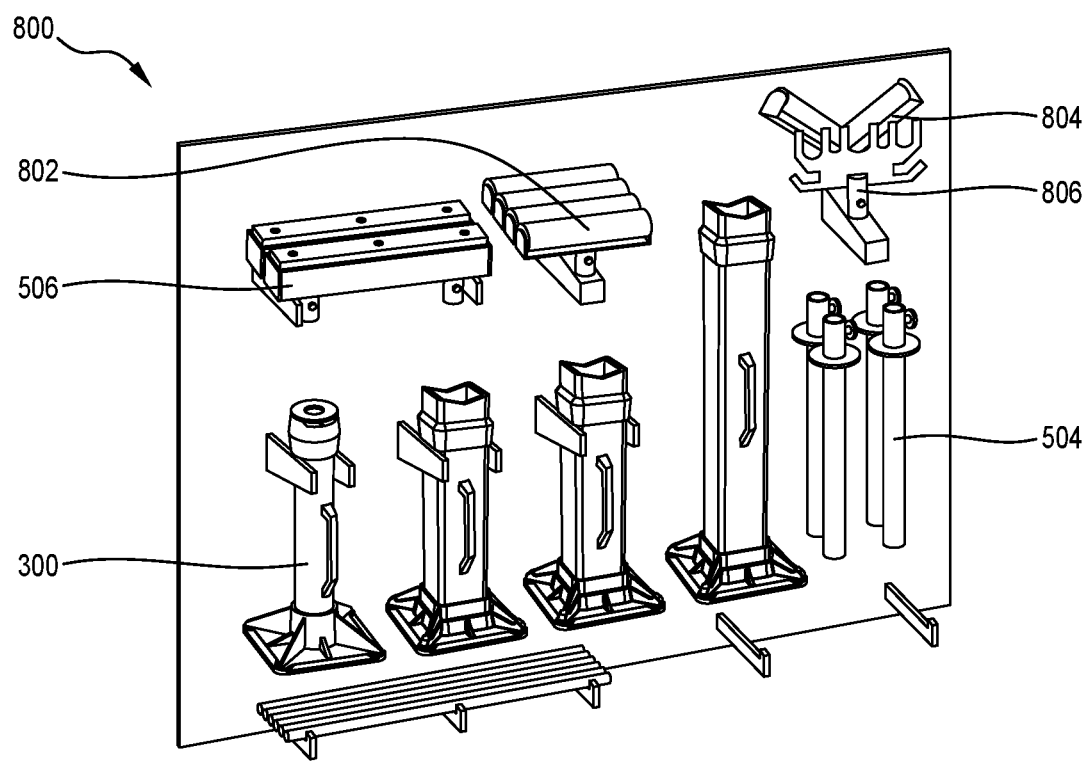
FIG. 8 is a perspective view of a jack stand and accessory mounting bracket.

FIG. 8 shows a stand mounting bracket 800 for mounting the stand 300 along with a variety of accessories which can be used in conjunction with the stand 300. One accessory 506 includes a platform for supporting cables or hoses. Another accessory 802 includes one or more rollers for supporting metal strip material being fed to a cutting machine. Yet another accessory 804 includes a boat holder including a pair of angled rollers for holding the hull of a boat. Each accessory includes a bottom fastening receptacle 806 for fastening to the upright 504.

The jack stand assembly 500 may similarly be formed using jack stands 100.

A person skilled in the art will appreciate that many embodiments and variations can be made without departing from the ambit of the present invention.

In compliance with the statute, the invention has been described in language more or less specific to structural or methodical features. It is to be understood that the invention is not limited to specific features shown or described since the means herein described comprises preferred forms of putting the invention into effect.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

The claims defining the invention are as follows:

1. A jack stand including:
   a base;
   a pultruded post including composite material and for extending from the base, the composite material including wound reinforcing fibers to improve compressive strength, the reinforcing fibers being separately wound in both clock-wise and anticlockwise directions along the pultruded post to further improve compressive strength; and
   a top for topping the pultruded post and for engaging with a load, wherein the composite material includes a matting that aligns the fibers in orientations other than longitudinally along the pultruded post to improve compressive strength.

2. The jack stand as claimed in claim 1, wherein the pultruded post is less than 12 kg enabling the jack stand to be conveniently moved by a single person without exposing the single person to significant risk of injury.

3. The jack stand as claimed in claim 1, wherein the composite material includes polymeric resin material and fibers.

4. The jack stand as claimed in claim 3, wherein the fibers include any one or more of glass fibers, carbon fibers, and aramid fibers.

5. The jack stand as claimed in claim 1, wherein the pultruded post is rated up to at least 12 tonne or 30 tonne.

6. The jack stand as claimed in claim 1, wherein the pultruded post has a single wall or two or more walls that are bonded together.

7. The jack stand as claimed in claim 1, wherein the pultruded post includes a curved wall and a quadrilateral wall.

8. The jack stand as claimed in claim 1, wherein the base is wider than the pultruded post to distribute weight of the load and/or wherein the base defines a receptacle for receiving the pultruded post.

9. The jack stand as claimed in claim 8, wherein the receptacle includes an outer wall and an inner wall of different shape and for forming a complementary fit with the pultruded post.

10. A jack stand as claimed in claim 8, wherein the base further includes one or more strengthening fillets extending between the receptacle and a plate.

11. The jack stand as claimed in claim 1, wherein the top defines a receptacle for receiving the pultruded post and/or wherein the top defines a cradle for cradling and contacting the load.

12. A jack stand assembly including:
    at least one jack stand as claimed in claim 1;
    at least one upright extending from a respective jack stand; and
    an accessory supported by the upright.

13. The jack stand assembly as claimed in claim 12, wherein the upright is length adjustable.

14. The jack stand assembly as claimed in claim 12, wherein the upright is received in the jack stand.

15. The jack stand assembly as claimed in claim 12, further including a fastening arrangement for fastening the upright to the base of the stand, the fastening arrangement including a retainer for inserting into the base.

16. The jack stand assembly as claimed in claim 12, including a rotation inhibitor including a pin passing through each stand and upright for inhibiting rotation of the upright relative to the stand.

17. A pultruded jack stand post including composite material, the composite material including wound reinforcing fibers to improve compressive strength, the reinforcing fibers being separately wound in both clock-wise and anti-clockwise directions along the pultruded jack stand post to further improve compressive strength, wherein the composite material includes a matting that aligns the fibers in orientations other than longitudinally along the pultruded jack stand post to improve compressive strength.

18. A jack stand including:
    a base;
    a pultruded post including composite material and for extending from the base, the composite material including wound reinforcing fibers to improve compressive strength, the reinforcing fibers being separately wound in both clock-wise and anticlockwise directions along the pultruded post to further improve compressive strength; and
    a top for topping the pultruded post and for engaging with a load, wherein the pultruded post is less than 12 kg enabling the jack stand to be conveniently moved by a single person without exposing the single person to significant risk of injury.

* * * * *